United States Patent [19]

Quick

[11] 4,043,224
[45] Aug. 23, 1977

[54] MECHANICAL DIFFERENTIAL LOCK
[75] Inventor: David C. Quick, New Berlin, Wis.
[73] Assignee: Allis-Chalmers Corporation, Milwaukee, Wis.
[21] Appl. No.: 633,480
[22] Filed: Nov. 19, 1975

Related U.S. Application Data

[63] Continuation-in-part of Ser. No. 478,737, June 12, 1974, abandoned.

[51] Int. Cl.² .............................................. F16H 1/44
[52] U.S. Cl. ................................................... 74/710.5
[58] Field of Search ...................... 74/710.5; 192/67 P

[56] References Cited

U.S. PATENT DOCUMENTS

| 964,387 | 7/1910 | Burnam | 74/710.5 |
|---|---|---|---|
| 1,338,720 | 5/1920 | Darr | 74/710.5 |
| 1,622,449 | 3/1927 | Katz | 74/710.5 |
| 1,723,901 | 8/1929 | Todd | 74/710.5 |
| 1,743,032 | 1/1930 | Focher, Jr. | 74/710.5 |
| 1,786,492 | 12/1930 | Hustvet | 74/710.5 |
| 2,017,577 | 10/1935 | Adams | 74/710.5 |
| 2,558,417 | 6/1951 | Brown | 74/710.5 |
| 2,559,944 | 7/1951 | Chapp | 74/710.5 |
| 2,699,075 | 1/1955 | Buckendale | 74/710.5 X |
| 3,105,394 | 10/1963 | Salzmann | 74/710.5 |

FOREIGN PATENT DOCUMENTS 1,915,348  10/1970  Germany ........................... 74/710.5

Primary Examiner—Samuel Scott
Assistant Examiner—Lance W. Chandler
Attorney, Agent, or Firm—Arthur L. Nelson

[57] ABSTRACT

A differential having a mechanical differential lock for use in a motor vehicle. The lock includes a plurality of pins carried on a clutch collar for sliding through openings in the differential housing to selectively engage peripheral grooves on one of the side gears of the differential to lock the differential for synchronous rotation of the side gears of the differential.

10 Claims, 9 Drawing Figures

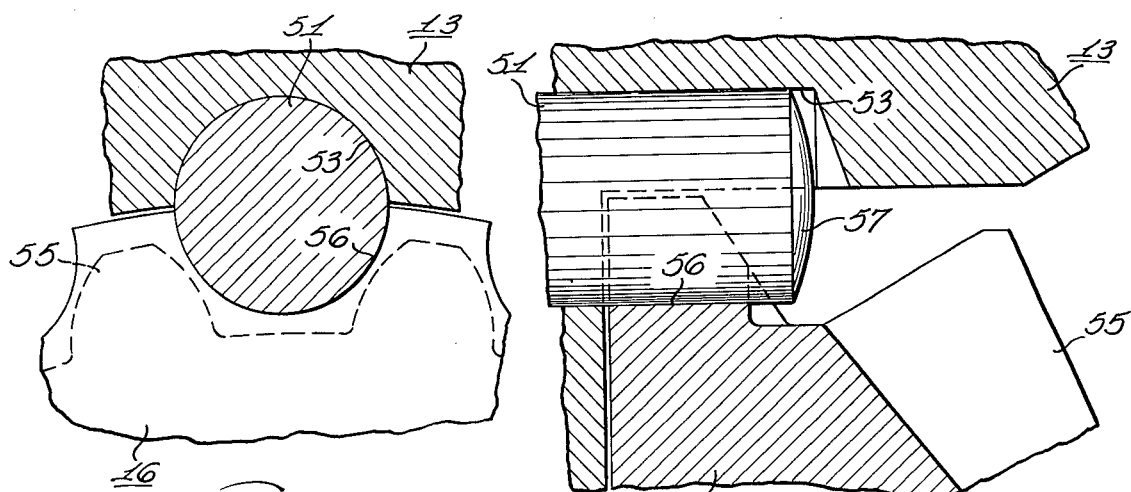
Fig. 3
Fig. 4
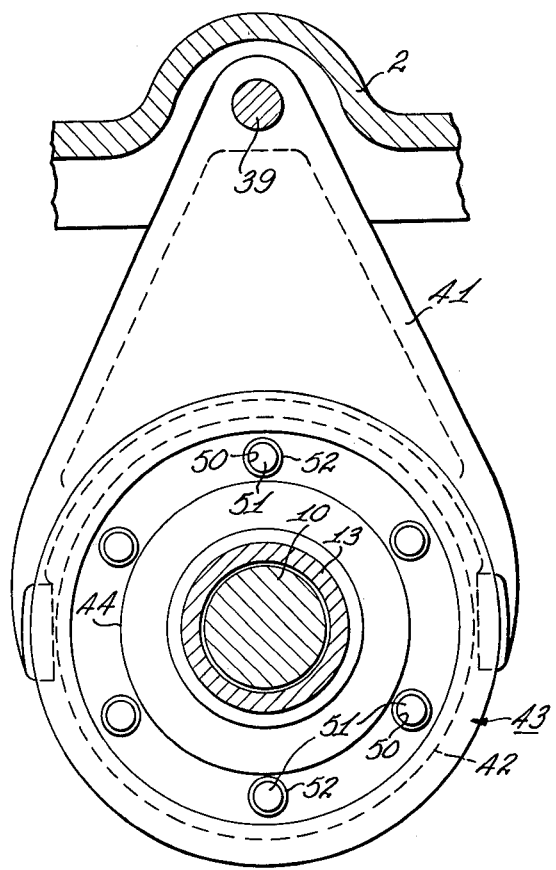
Fig. 5

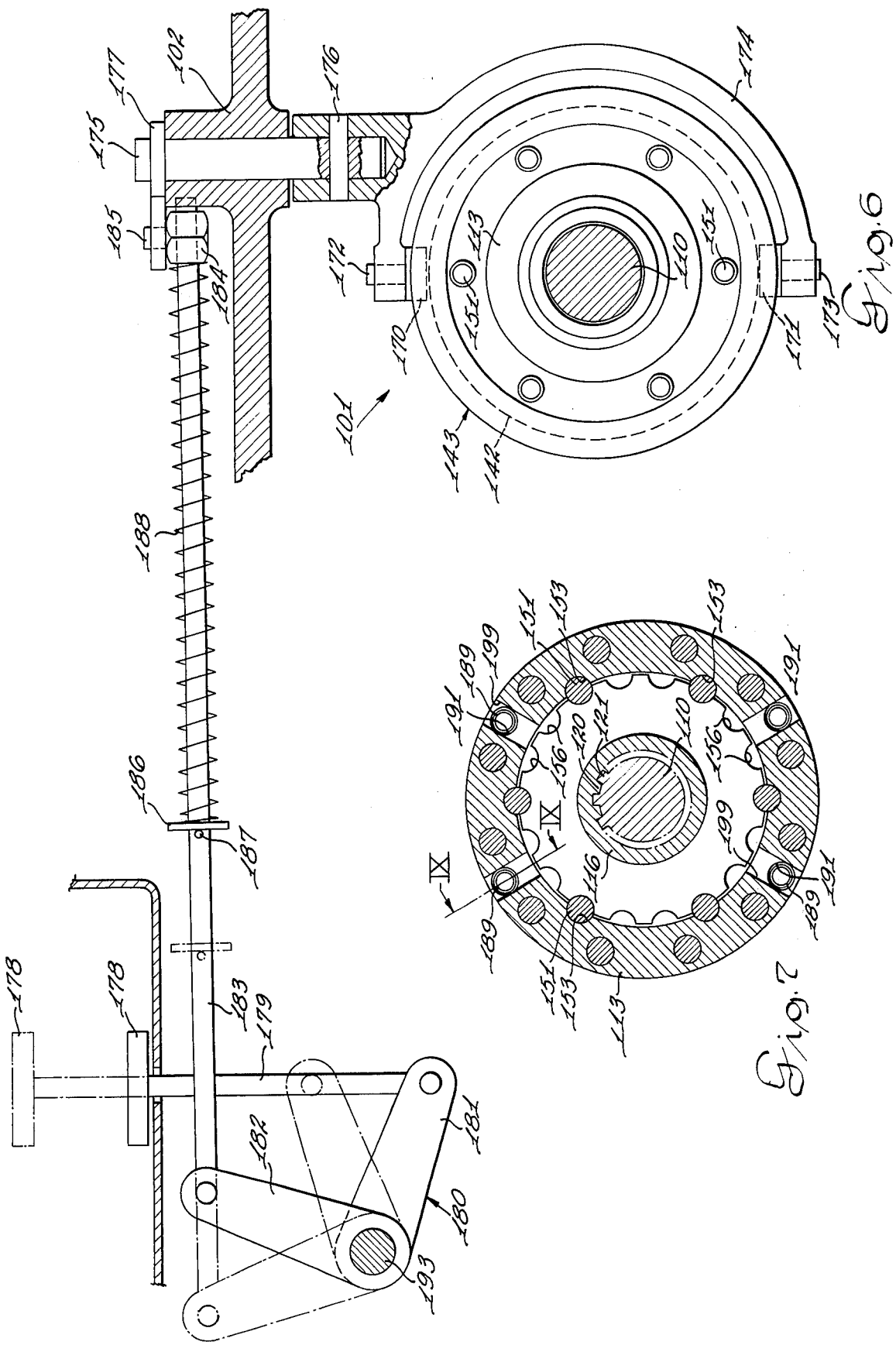

MECHANICAL DIFFERENTIAL LOCK

This is a continuation-in-part application, Ser. No. 478,737 filed June 12, 1974, now abandoned.

This invention relates to a differential for a vehicle and more particularly to a mechanical clutch having locking pins slidably reciprocating within openings in the differential housings to selectively disengage one of the side gears for synchronous rotation of the side gears when the differential is locked.

Conventional tractors employ a differential in the final drive system for driving the rear wheels. The differential permits the rear wheels to rotate at different rates while the vehicle is turning. By the use of the differential the driving torque is transmitted through the differential and applied to either wheel equally even though one wheel is rotating at a faster rate than the other. While the differential rate of rotation of the rear wheels is necessary in turning, there are times when it is desirable to lock the rear wheels to rotate synchronously. By locking the rear wheels of the vehicle to rotate at a synchronous speed, variations in traction of the rear wheels will not affect the rate of relative rotation between the rear wheels. Accordingly, the rear wheels rotate in unison even though there is variable traction which would ordinarily cause slippage of one or the other wheel. This operation of the differential assures a more even drawbar pull from the vehicle.

The locking of the differential may be accomplished mechanically or hydraulically in response to a control operated by the operator of the vehicle. Accordingly, this invention provides such a lock for the differential which can readily lock or unlock the differential by the use of a positive clutch on the differential.

It is an object of this invention to provide a mechanical differential lock on the vehicle differential to positively lock the differential for synchronous rotation of the rear wheel drive shafts.

It is another object of this invention to provide a vehicle differential having a differential lock including a slidable clutch collar with a plurality of pins to selectively lock one of the side gears with the differential housing.

It is a further object of this invention to provide a vehicle differential with a differential lock including a mechanically operated sliding clutch collar carrying a plurality of pins reciprocably moving within openings in the differential housing to engage peripheral grooves on one of the side gears to positively lock the differential on the vehicle.

The objects of this invention are accomplished by providing a differential between the propeller shaft and the rear axles on a tractor. The ring gear drives through a housing and pinion gears to drive the side gears. A mechanically operated clutch collar which carries a plurality of pins on axes parallel with the sliding axis of the clutch collar is mounted on the differential housing and reciprocates the pins through openings in the housing. The pins slidably engage peripheral grooves on one of the side gears to lock the differential for rotation as a locked assembly to synchronously rotate the two drive shafts and the rear wheels of the vehicle. A manually operated mechanical operating mechanism engages the differential lock through resilient means. When the manual operating force is withdrawn a differential release automatically unlocks the differential.

Referring to the drawings, the preferred embodiments of this invention are illustrated:

FIG. 3 illustrates an enlarged fragmentary view of a portion of one of the side gears and one of the locking pins;

FIG. 4 illustrates a fragmentary cross-section view of one of the gears and one of the locking pins positioned in one of the peripheral grooves of the side gear;

FIG. 5 illustrates a fragmentary cross-section view taken on line V—V of FIG. 1;

FIG. 6 illustrates the manually operated mechanical means for engaging the differential lock through resilient means;

FIG. 7 is a cross-section view taken on line VII—VII of FIG. 8;

Figure 1:
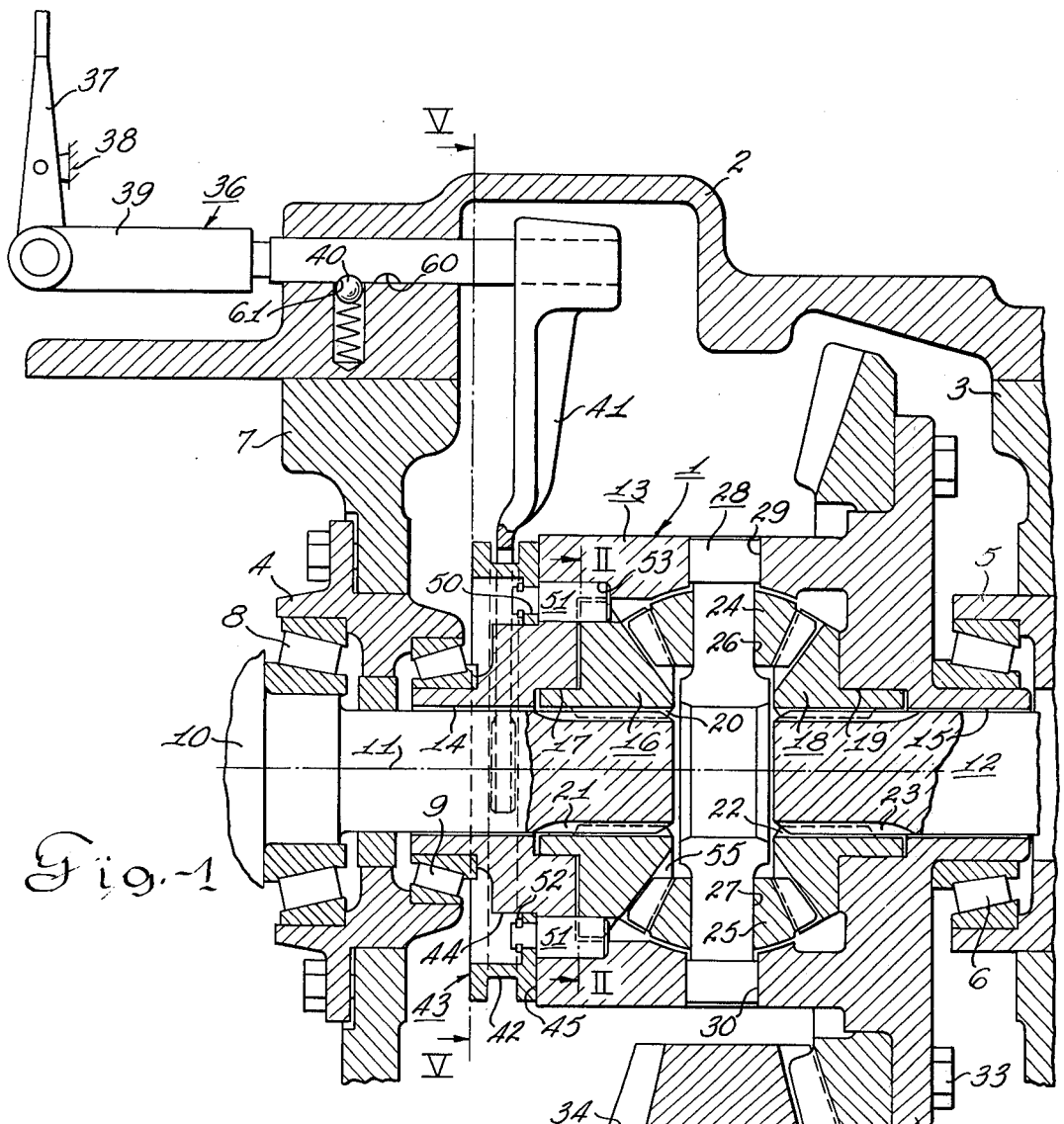
FIG. 1 illustrates a cross-section view of the differential and a propeller shaft in the rear drive housing.
Figure 2:
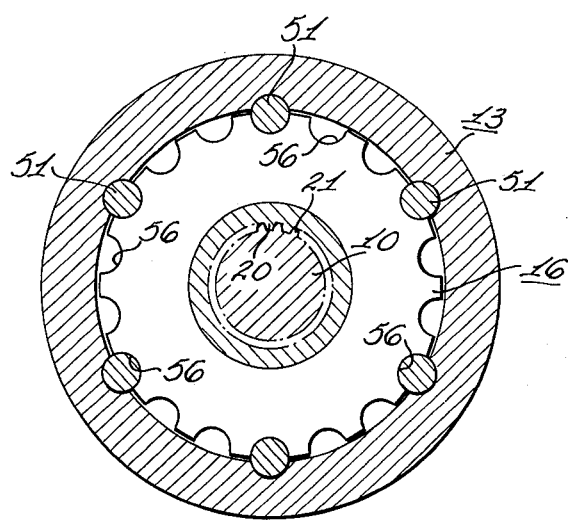
FIG. 2 illustrates a view taken on line II—II of one of the side gears.
Figure 8:
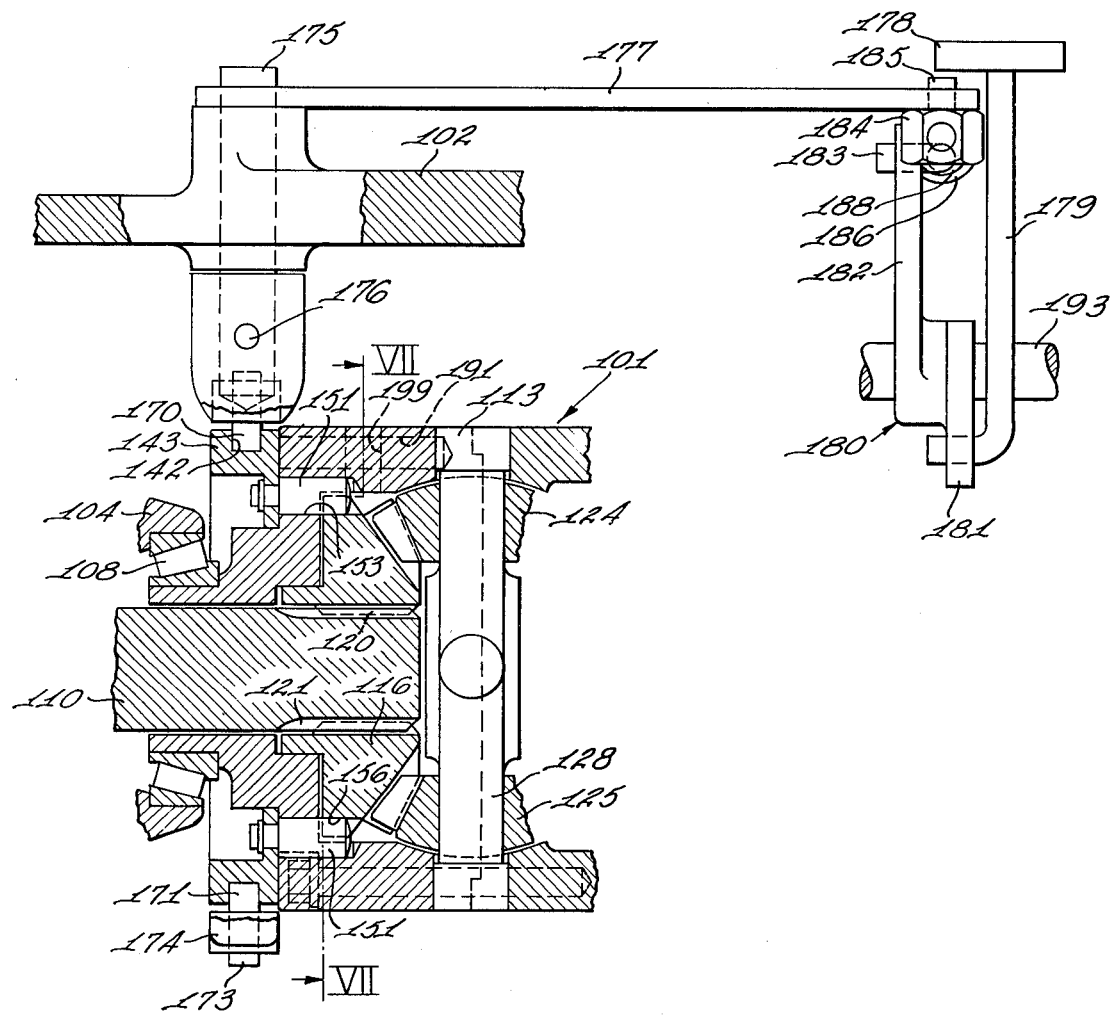
FIG. 8 is a cross-sectiion view of the differential showing the differential lock and the manually operated mechanical means connected thereto.
Figure 9:
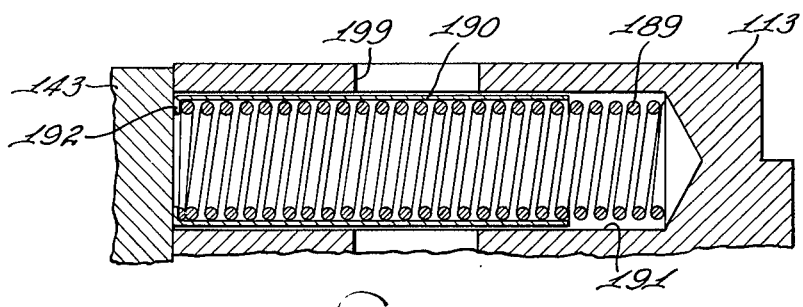
FIG. 9 is a cross-section view taken on line IX—IX of FIG. 7 showing one of the release springs of the differential lock for automatically releasing the differential when the actuating force is withdrawn.

Referring to the drawings, FIG. 1 illustrates the cross-section view of the differential. The differential 1 is shown in the rear axle housing 2. The rear axle housing 2 includes a flange 3 supporting the bearing retainer 5. The bearing retainer 5 supports the differential bearing assembly 6 and a rear axle bearing assembly not shown. The annular flange 7 carries the bearing retainer 4 which in turn supports a rear axle bearing assembly 8 and the differential bearing assembly 9. The left-hand rear axle 10 rotates on the common axis 11 with the right-hand rear axle 12.

The differential 1 includes the housing 13 which is rotatably supported by the differential bearings 6 and 9. The housing 13 defines an opening 14 to receive the left-hand rear axle 10 and an opening 15 to receive a right-hand rear axle 12. The left-hand side gear 16 is rotatably supported on the bearing surface 17 of the housing 13. The right-hand side gear 18 is rotatably supported on the bearing surface 19 of the housing 13. The side gear 16 is formed with the spline 20 which engages a mating spline 21 on the left-hand axle 10. The side gear 18 is formed with a spline 22 which engages a mating spline 23 on the right-hand gear shaft 12.

A plurality of pinion gears 24 and 25 mesh with the side gears 16 and 18. The pinion gears 24 and 25 are mounted on the bearing surfaces 26 and 27 of the spider 28. The spider 28 is received in the opening 29 and 30 in the housing 13 of the differential 1.

The housing 13 also forms a radial flange 31 for mounting of the ring gear 32 which is fastened by means of a plurality of bolts 33. The ring gear 32 engages the drive pinion 34 which is connected to the propeller shaft 35. The propeller shaft 35 drives the differential which in turn drives the drive shaft 10 and 12 to drive the rear wheels of the vehicle.

A mechanical actuating linkage 36 includes a lever 37 pivotally mounted on the chassis 38. Lever 37 is pivotally connected to a shift rail 39 which is selectively retained in two positions by the detent 40. The shift rail 39 is connected to a shifting for 41 which is received within the annular recess 42 on the clutch collar 43. The clutch collar 43 slides on the annular facing 44 on the periphery of a differential housing 13. The movement of clutch collar 43 is limited by the radial facing 45 of the differential housing 13.

The clutch collar 43 is formed with a plurality of openings 50 which receive a plurality of pins 51. Each of the pins is fastened by a snap ring 52. Each of the pins 51 extends into an opening 53 in the differential housing 13. The pins 51 are carried in the clutch collar 43 within their respective openings 50 to reciprocate to an engaging position with the side gear 16 and to a disengaging position to the left of the side gear 16.

The side gear 16 is formed with a plurality of teeth 55 on its front facing which engaged the pinion gears 24 and 25. The rear facing of the side gear 16 is formed with axial grooves 56 on its periphery for engaging with the pins 51. The pins 51 are always retained within the openings 53 in housing 13 and selectively extend into the grooves 56 to lock the side gear 16 with the differeential housing 13.

A more detailed illustration of the pins 51 in the side gear 16 is shown in FIGS. 3 and 4. The grooves 56 are arcuate grooves in the periphery of the side gears 16 which engage the cylindrical pins 51. The front end of the pins 51 is formed with a curved surface 57 to facilitate reception of the cylindrical pin in the axial groove 56 for locking the side gear by the pins 51.

Referring to FIG. 6, the clutch collar 143 is shown with an annular recess 142 receiving the shoulders 170 and 171 of the pins 172 and 173. The pins 172 and 173 pivot on the end of the fork 174 which is held in position by the cross pin 176. The shaft 175 also is locked to the lever 177. The shaft 175 is pivotally supported in the housing 102 of the differential 101.

The footbutton 178 and depending rod 179 are pivotally connected to the bell crank 180. The bell crank 180 has an arm 181 pivotally connected to the depending rod 179. The arm 182 is pivotally connected to the push rod 183 which extends through an opening in the nut 184. The nut 184 is pivotally mounted on the stubshaft 185 on lever 177. Washer 186 is mounted on the push rod 183 and held in position by the pin 187. The spring 188 is compressively positioned between the washer 186 and the nut 184 and operates the differential lock mechanism when the footbutton 178 is depressed. The stored energy in the spring 188 is sufficient to overcome the force of release springs 189 in the differential when the button 178 is depressed. The differential will lock when there is alignment between the pins 151 and the grooves 156 in the side gears 116. The differential release mechanism consists essentially of four springs 189 each received in a sleeve 190 and each sleeve 190 reciprocates within an opening 191. The flange 192 of the sleeve 190 engages the collar 143 and overcomes any residual force of the spring 188 when the footbutton 178 is allowed to return to its retracted or upper position. A partial cross-section view of the differential is shown which consists essentially of the drive shaft 110 embraced by housing 113 and the bearing 108 mounted in the bearing retainer 104. The differential housing 113 of the differential 101 supports the shaft 128 which in turn rotatably supports the pinions 124 and 125. A plurality of pins 151 seated in the collar 143 extend into the openings 153 in the housing 113 and extend into the grooves 156 of the side gear 116. The shaft 110 is connected to the side gear 116 by a spline connection 120 of the side gear 116 and the spline 121 of the drive shaft 110.

The housing 113 is formed with lubrication passages 199 which extend through the openings 191 to assure lubrication of the sleeve 190 and the spring 189 for release of the differential when the footbutton 178 is released and there is no torque binding the pins 151 in grooves 156. The openings 191 are symmetrically spaced on opposing sides of the vertical center line as viewed in FIG. 7. The openings 191 are angularly spaced at approximately 30° to either side of the center line as shown in FIG. 7. The force of the four springs 189 is sufficient to overcome the residual force on the actuator spring 188 when the footbutton 178 is released.

The operation of the locking means for the differential will be described in the following paragraphs:

The differential lock on the differential 1 is mechanically operated by the controlling linkage 36. The lever 37 moves the shift rail 39 to a detent position in which the detent 40 engages the recess 60 or 61. In the position as shown in FIG. 1, the differential is locked. The plurality of pins 51 are received within the plurality of peripheral grooves 56 so that the side gear 16 is locked to the housing 13 and the differential rotates as a unit. When the pinion gear 34 drives the ring gear 32, the drive shafts 10 and 12 rotate synchronously.

When the lever 37 is moved in a clockwise direction the detent 40 is received within the recess 60 and the clutch collar 43 moves in the left-hand direction. As the clutch collar 43 moves in the left-hand direction it is positioned by the detent 40. In this position the plurality of pins 51 are completely retracted from the annular recesses 56 in the rear face of the side gear 16. The pins, however, are never retracted from the openings 53 in which they are received. Accordingly, the clutch collar 43 carries the plurality of pins 51 while the openings 53 maintain their axial alignment in parallel relationship to the axis of the movement of the clutch collar. The axial movement of the clutch collar 43 is coincidental with the axis 11 of the rear drive axles 10 and 12. When the pins 51 are withdrawn from their engaging position with the peripheral grooves 56 in the side gear 16, the differential is released. In this position, the side gears 16 and 18 can freely rotate relative to each other in driving their respective axle. The ring gear 32 is driven by the pinion 34 which merely drives the housing while the differential action of the gears 10 and 12 is permitted through the differential which is free to rotate in response to the loads on the rear wheels.

Referring to FIGS. 6, 7, 8 and 9, the operation of the embodiments of the invention shown in FIGS. 6, 7, 8 and 9 will be described in the following paragraphs.

As the button 178 is depressed the bell crank 180 pivots about the shaft 193 forcing the push rod 183 in the right-hand direction as viewed in FIG. 6. This in turn creates a compression force in the spring 188 which is sufficient to bias the fork 174 in a right-hand direction as viewed in FIG. 8. Continued force on the fork 174 causes the pins 151 to move forwardly into the openings 153 of the housing 113 and into the grooves 156 of the side gear 116 and lock the side gear 116 with the housing 113 as the differential is operated. The rear axles then rotate synchronously as long as the differential is engaged.

When the footbutton 178 is released the spring 188 extends and causes the footbutton 178 to lift to the released position as shown in FIG. 6. The compression force of the spring 188 is no longer adequate to overcome the compressive forces of the plurality of springs 189 and consequently the four springs 189 force the collar 143 to the left retracting the pins 151 from the grooves 156 in the side gear 116. The differential is automatically released and the differential can again operate for differential rotation of the side gears and mating rear drive axles.

The embodiments of the invention in which an exclusive property or privilege is claimed are defined as follows:

1. A mechanical differential locking means on a differential in a drive mechanism of a motor vehicle comprising, a rear axle drive housing, a pair of drive axles, bearing means in said housing rotatably supporting said pair of drive axles on a common axis, a differential including a differential casing defining support bearing surfaces and a cylindrical collar bearing surface on its outer periphery, a ring gear connected to said differential casing for driving said differential, a pair of support bearings mounted in said housing and rotatably supporting said casing on said support bearing surfaces for rotation on said common axis, a pair of side gears mounted in said casing adapted for driving the pair of rear axles, bearing surfaces in said casing rotatably mounting said side gears or rotation on said common axis, one of said side gears defining a back surface engaging a mating surface on the internal portion of said casing, a pair of differential pinion gears rotatably mounted on an axis normal to said common axis and meshing with said side gears, a shift collar slidably mounted on said cylindrical collar bearing surface of said casing for slidable movement on said common axis, a plurality of cylindrical pins mounted on said collar with each pin defining an axis parallel to the said common axis, means defining a plurality of cylindrical openings of the same size as said cylindrical pins in said differential casing with each opening defining an axis parallel with said common axis and each of said openings extending to said back surface of said one of said side gears and around the outer periphery of said gear, said openings receiving said pins and contacting said pins over the entire portion of the pin extending into said casing, said one side gear defining peripheral semi-cylindrical grooves of the same curvature as said cylindrical pins for receiving said pins, an actuating mechanism including a resilient member biasing said collar and pins reciprocally for selectively engaging said pins from said peripheral grooves on said one side gear for synchronous operation of said side gears when said actuating mechanism is operated, a differential release means including means defining a plurality of holes in said differential casing, resilient means in each of said holes engaging said collar and resiliently biasing said collar with said pins from said peripheral grooves on said one side gear against any residual force in said resilient member for differential operation of said side gears.

2. A mechanical differential locking means on a differential in a drive mechanism of a motor vehicle as set forth in claim 1 wherein said actuating mechanism includes a push rod reciprocably mounted in said differential casing, said resilient member defining a spring mounted on said rod compressively biasing differential to an engaged position when said actuating mechanism is operated.

3. A mechanical differential locking means on a differential in a drive mechanism of a motor vehicle as set forth in claim 1 wherein said side gears and said pinion gears define bevel gears in constant engagement with each other.

4. A mechanical differential locking means on a differential in a drive mechanism of a motor vehicle as set forth in claim 1 wherein said ring gear defines a face gear adapted for being driven by a pinion gear on a propeller shaft.

5. A mechanical differential locking means on a differential in a drive mechanism of a motor vehicle as set forth in claim 1 wherein said mating surface on the internal portion of said casing forms a thrust surface engaging said back surface of said one side gear.

6. A mechanical differential locking means on a differential in a drive mechanism of a motor vehicle as set forth in claim 1 wherein said clutch collar includes a plurality of openings in said collar, fastening means for fastening said pins in said clutch collar.

7. A mechanical differential locking means on a differential in the drive mechanism of a motor vehicle as set forth in claim 1 wherein said one side gear defines perhipheral arcuate grooves for receiving said plurality of pins when said differential is locked.

8. A mechanical differential, locking means on a differential in a drive mechanism of a motor vehicle as set forth in claim 1 wherein said side gears define bevelled gear teeth on their front facing, means defining perhipheral arcuate grooves on the periphery of said one side gear wherein said axial grooves extend from the back facing of said side gear for receiving said plurality of pins for locking said differential.

9. A mechanical differential locking means on a differential in a drive mechanism of a motor vehicle as set forth in claim 1 wherein said clutch collar defines a plurality of axial holes on a common radius, said plurality of pins received in said plurality of holes of said clutch collar, snap rings for locking said pins in said holes of said clutch collar.

10. A mechanical differential locking means in a drive mechanism of a motor vehicle as set forth in claim 1 wherein said means limits the reciprocal movement of such collar to a distance shorter than the axial length of said openings in said differential casing to thereby maintain axial alignment of said plurality of pins in said casing in the engaged or disengaged position.

* * * * *